(12) United States Patent
    Diab (10) Patent No.: US 9,225,598 B2
(45) Date of Patent: *Dec. 29, 2015

(54) METHOD AND SYSTEM FOR END-TO-END MANAGEMENT OF ENERGY EFFICIENT NETWORKING PROTOCOLS

(71) Applicant: Broadcom Corporation, Irvine, CA (US)

(72) Inventor: Wael William Diab, San Francisco, CA (US)

(73) Assignee: BROADCOM CORPORATION, Irvine, CA (US)

( * ) Notice: Subject to any disclaimer, the term of this patent is extended or adjusted under 35 U.S.C. 154(b) by 36 days.

This patent is subject to a terminal disclaimer.

(21) Appl. No.: 13/975,478

(22) Filed: Aug. 26, 2013

(65) Prior Publication Data

US 2013/0336163 A1     Dec. 19, 2013

Related U.S. Application Data

(63) Continuation of application No. 12/571,208, filed on Sep. 30, 2009, now Pat. No. 8,619,603.

(60) Provisional application No. 61/184,269, filed on Jun. 4, 2009.

(51) Int. Cl.
    *H04J 1/16*     (2006.01)
    *H04L 12/24*    (2006.01)
    (Continued)

(52) U.S. Cl.
    CPC ............ *H04L 41/0833* (2013.01); *H04L 12/10* (2013.01); *H04L 12/12* (2013.01);
    (Continued)

(58) Field of Classification Search
    CPC .... H04L 12/12; H04L 41/0833; Y02B 60/35; Y02B 60/34; Y02B 60/43; Y02B 60/30; Y02B 60/44
    See application file for complete search history.

(56) References Cited

U.S. PATENT DOCUMENTS 6,795,450 B1     9/2004  Mills et al.
6,996,630 B1     2/2006  Masaki et al.
                 (Continued)

FOREIGN PATENT DOCUMENTS

CN      1839617 A      9/2006
EP      2048825 A1     4/2009

OTHER PUBLICATIONS

CN Office Action, Jul. 26, 2012.
(Continued)

*Primary Examiner* — Brian O'Connor
(74) *Attorney, Agent, or Firm* — Foley & Lardner LLP; Christopher J. McKenna; Helen H. Zhang (57) ABSTRACT

Aspects of a method and system for end-to-end management of energy efficient networking protocols are provided. In this regard, a path between two network nodes may be determined and one or more messages may be generated. The one or more messages may be communicated to one or more network nodes along the determined path and may configure an EEN control policy and/or one or more (EEN) parameters in those network nodes. The one or more generated messages may comprise a distinct marking that may, upon detection by the network nodes along the determined path, trigger configuration of the EEN control policy and/or EEN parameters within the one or more network nodes. The one or more messages may be may be utilized to enable and disable EEN in one or more network nodes along the path.

20 Claims, 5 Drawing Sheets

(51) Int. Cl.
*H04L 12/10* (2006.01)
*H04L 12/12* (2006.01)
*H04L 12/46* (2006.01)

(52) U.S. Cl.
CPC ......... *H04L12/4625* (2013.01); *H04L 41/0893* (2013.01); *Y02B 60/34* (2013.01); *Y02B 60/35* (2013.01); *Y02B 60/43* (2013.01)

(56) References Cited

U.S. PATENT DOCUMENTS

| | | | |
|---|---|---|---|
| 7,003,331 | B2 | 2/2006 | Cromer |
| 7,116,682 | B1 | 10/2006 | Waclawsky |
| 7,145,876 | B2 | 12/2006 | Huang et al. |
| 7,203,849 | B2 | 4/2007 | Dove |
| 7,260,106 | B2 * | 8/2007 | Yavatkar et al. ............. 370/428 |
| 7,457,973 | B2 | 11/2008 | Liu |
| 7,610,500 | B2 * | 10/2009 | Cherukuri et al. ............ 713/320 |
| 7,769,362 | B2 | 8/2010 | Heidari-Bateni et al. |
| 7,916,676 | B2 | 3/2011 | Elzur et al. |
| 8,085,745 | B2 | 12/2011 | Park et al. |
| 8,107,365 | B2 | 1/2012 | Barrass |
| 8,112,646 | B2 * | 2/2012 | Tsai .............................. 713/320 |
| 8,127,162 | B2 | 2/2012 | Satoh |
| 8,214,665 | B2 | 7/2012 | Diab |
| 8,234,513 | B2 * | 7/2012 | Rodriguez ................... 713/340 |
| 8,276,010 | B2 * | 9/2012 | Vavilala et al. .............. 713/320 |
| 8,619,603 | B2 * | 12/2013 | Diab ............................ 370/252 |
| 8,848,538 | B2 * | 9/2014 | Welin et al. ................... 370/236 |
| 2003/0221026 | A1 | 11/2003 | Newman |
| 2003/0223390 | A1 | 12/2003 | Huang et al. |
| 2005/0003794 | A1 | 1/2005 | Liu |
| 2006/0034295 | A1 | 2/2006 | Cherukuri et al. |
| 2008/0186875 | A1 | 8/2008 | Kitani |
| 2008/0192752 | A1 | 8/2008 | Hyslop et al. |
| 2008/0232290 | A1 | 9/2008 | Elzur et al. |
| 2009/0016323 | A1 * | 1/2009 | Ethier et al. .................. 370/352 |
| 2009/0248828 | A1 | 10/2009 | Gould et al. |
| 2010/0128738 | A1 | 5/2010 | Barrass |
| 2010/0241880 | A1 | 9/2010 | Wertheimer et al. |
| 2010/0262848 | A1 | 10/2010 | Bobrek et al. |
| 2011/0022716 | A1 | 1/2011 | Diab |

OTHER PUBLICATIONS

CN Office Action, May 21, 2014.
TW Office Action, Oct. 22, 2013.
International Search Report dated Sep. 8, 2010 re: EP app 10005357.8-2416.
Francisco Blanquicet et al., "Managing Energy Use in a Network With a New SNMP Power State MIB," 33rd IEEE Conference on local computer networks (LCN 2008),Oct. 14-17, 2008, Montreal, Que, Canada, IEEE, Piscataway, NJ, USA, Oct. 14, 2008 , pp. 509-511, XP031355890, ISBN: 978-1-4244-2412-2, Sections II, II and V.
Geoffrey M. Garner, et al., "IEEE 802.1 AVB and Its Application in Carrier-Grade Ethernet [Standards Topic]," IEEE Communications Magazine, IEEE Service Center, Piscataway, US, vol. 45, No. 12, Dec. 1, 2007, pp. 126-134, XP01119845915SN: 0163-6804, Sections: "introduction", "SRP Basic Operation" figure 1.
Teener, M. J., "AudioNideo Bridging for Home Networks (IEEE 802.1 AV Bridging Task Group)," Internet Citation Jun. 1, 2007, pp. 1-35, XP002509617, http://www.ieee802.org/3/eee_study/public/jul07/teener_1 _0707.pdf, pp. 12, 13.
LAN/MAN Standards Committee of the IEEE Computer Society, "IEEE Draft P802.3az 01.0," Nov. 1, 2008, pp. 1-11, http://www.ieee802.org/3/az/>.
Hugh Barass, et al., "Energy Efficient Ethernet" IEEE 802 Tutorial, San Francisco, CA, Jul. 16, 2007, XP-002509614.

* cited by examiner

METHOD AND SYSTEM FOR END-TO-END MANAGEMENT OF ENERGY EFFICIENT NETWORKING PROTOCOLS

CROSS-REFERENCE TO RELATED APPLICATIONS/INCORPORATION BY REFERENCE

This patent application is a continuation of non-provisional application Ser. No. 12/571,208, filed Sep. 30, 2009, which makes reference to, claims priority to and claims benefit from provisional application No. 61/184,269, filed on Jun. 4, 2009.

Non-provisional application Ser. No. 12/571,208 also makes reference to non-provisional application Ser. No. 12/015,671, filed on Jan. 17, 2008.

Each of the above stated applications is hereby incorporated herein by reference in its entirety.

FIELD OF THE INVENTION

Certain embodiments of the invention relate to networking. More specifically, certain embodiments of the invention relate to a method and system for end-to-end management of energy efficient networking protocols.

BACKGROUND OF THE INVENTION

Communications networks and in particular Ethernet networks, are becoming an increasingly popular means of exchanging data of various types and sizes for a variety of applications. In this regard, Ethernet networks are increasingly being utilized to carry voice, data, and multimedia traffic. Accordingly more and more devices are being equipped to interface to Ethernet networks. Broadband connectivity including internet, cable, phone and VOIP offered by service providers has led to increased traffic and more recently, migration to Ethernet networking. Much of the demand for Ethernet connectivity is driven by a shift to electronic lifestyles involving desktop computers, laptop computers, and various handheld devices such as smart phones and PDA's. Applications such as search engines, reservation systems and video on demand that may be offered at all hours of a day and seven days a week, have become increasingly popular. As an increasing number of portable and/or handheld devices are enabled for Ethernet communications, battery life may be a concern when communicating over Ethernet networks. Accordingly, ways of reducing power consumption when communicating over electronic networks may be needed.

Further limitations and disadvantages of conventional and traditional approaches will become apparent to one of skill in the art, through comparison of such systems with some aspects of the present invention as set forth in the remainder of the present application with reference to the drawings.

DETAILED DESCRIPTION OF THE INVENTION

Certain embodiments of the invention may be found in a method and system for end-to-end management of energy efficient networking protocols. In various embodiments of the invention, a path between two network nodes may be determined and one or more messages for configuring one or more energy efficient networking (EEN) parameters along the determined network path may be generated. The one or more messages may be communicated to the various nodes along the determined path. The one or more generated messages may comprise a distinct marking that may, upon detection by network nodes along the determined path, trigger configuration of the one or more EEN parameters within the one or more network nodes. The one or more messages may comprise one or more fields defined by the IEEE 802.1Qat standard, and one or more fields that convey information for configuring EEN parameters along the determined path. The one or more messages may be communicated in accordance with the simple network management protocol (SNMP). The one or more messages may be communicated in accordance with logical link discovery protocol (LLDP) or other OSI layer 2 protocols.

The path may be determined via communication of one or more packets along the path, where information identifying EEN capabilities of nodes along the determined path may be inserted by the network nodes along the determined path as the one or more packets traverse the determined path. In some instances, the EEN parameters may be stored in a PHY of each of said network nodes along the determined path. In some instances, the EEN parameters may be stored in devices associated with higher OSI layers. The one or more EEN parameters may be configured based on applications running on the first network node and/or applications running on the second network node. The network nodes may comprise end-systems such as computers, servers, and set-top-boxes. The network nodes may comprise intermediary nodes such as switches and routers. The one or more EEN parameters may be configured based on quality of service required for data to be communicated over the determined path. The one or more EEN parameters may be configured based on resource reservation packets communicated along the determined path. The one or more parameters may comprise a parameter that controls whether EEN is enabled or disabled in one or more of the network nodes.

Figure 1:
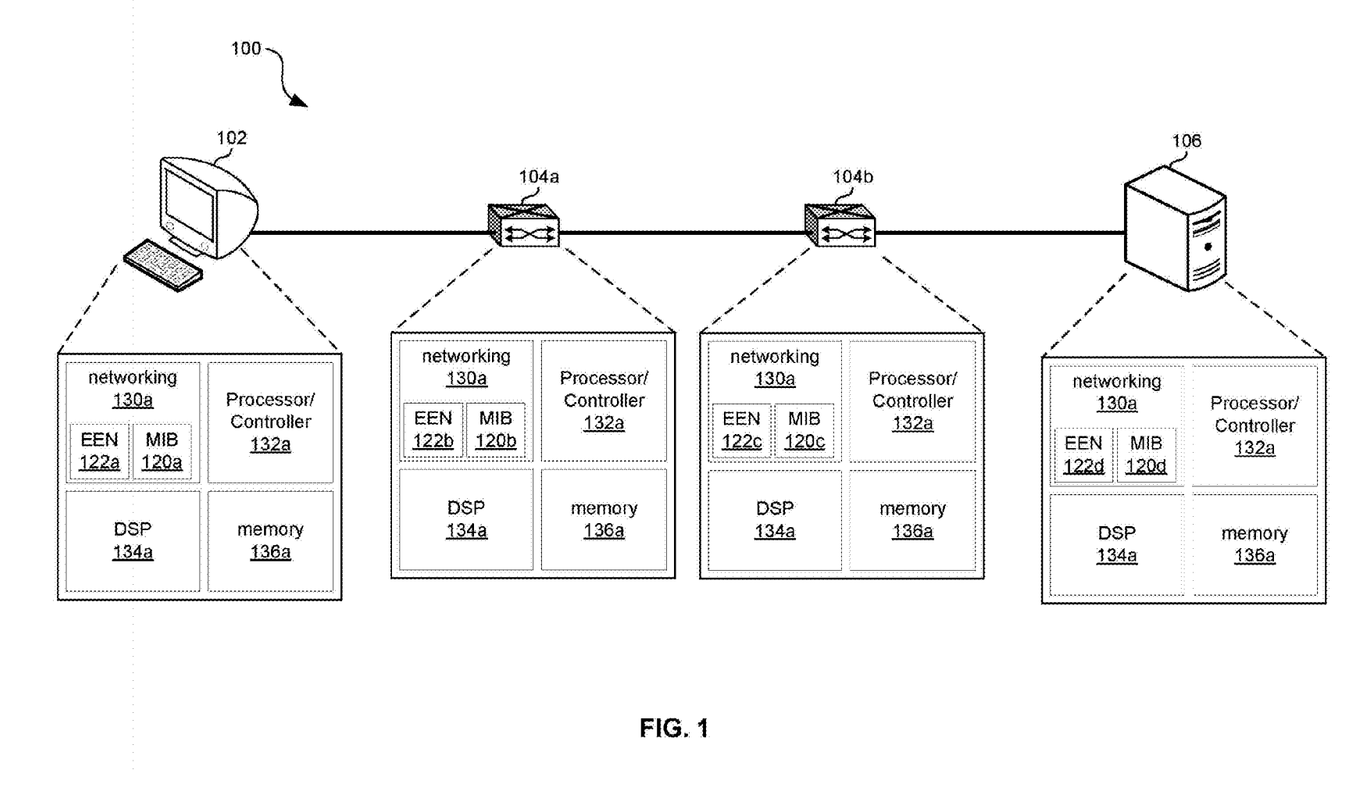
FIG. 1 is a diagram of an exemplary network in accordance with an embodiment of the invention.

FIG. 1 is a diagram of an exemplary network in accordance with an embodiment of the invention. Referring to FIG. 1A there is shown a network 100 comprising network nodes 102, 104a, 104b, and 106. The network node 102 may comprise an end-system such as, for example, a desktop computer, a laptop computer, a set-top-box, or a smart phone. The network nodes 104a and 104b may comprise, for example, gateways, routers, and/or switches. The network node 106 may comprise an end-system such as, for example, a mass storage device, a set-top-box, a mainframe computer, or a personal computer. Each of the network nodes 102, 104a, 104b, and 106 may comprise a corresponding one of networking subsystems 130a-130d, a corresponding one of processors 132a-

132d, a corresponding one of digital signal processors (DSPs) 134a-134d, and a corresponding one of memories 136a-136d.

The networking subsystems 130a-130d may each comprise suitable logic, circuitry, interfaces, and/or code that may be operable to handle communication of information with other network nodes via one or more communication media such as copper and/or optical fiber. Each of the networking subsystems 130a-130d may comprise, for example, a media access controller (MAC) and a physical layer transceiver (PHY). Each of the networking subsystems 130a-130d may be operable to implement Ethernet protocols, such as those in the IEEE 802.3 standards, for example. The networking subsystems 130a-130d may each be capable of communicating at one or more standard rates such as 10 Mbps, 100 Mbps, 1 Gbps, 40 Gbps, 10 Gbps, and/or 100 Gbps (e.g., 10GBASE-KX4 and/or 10GBASE-KR); and/or non-standard rates such as 2.5 Gbps, 5 Gbps, 6 Gbps, and 20 Gbps. The networking subsystems 130a-130d may each be operable to communicate over multiple channels and/or over a serial interface. In some instances, the networking subsystems 130a-130d may each comprise a pluggable module. Exemplary form factors for the pluggable modules may comprise SFP, SFP+, XEN-PAK, X2, XFP and XPAK modules. Also, the networking subsystems 130a-130d may support transmission and/or reception at a high(er) data in one direction and transmission and/or reception at a low(er) data rate in the other direction.

Additionally, each of the networking subsystems 130a-130d, or a PHY (not shown) within each of the networking subsystems 130a-130d, may be operable to implement one or more energy efficient techniques, which may be referred to generally as energy efficient networking (EEN), or in the specific case of Ethernet, as energy efficient Ethernet (EEE). For example, the networking subsystems 130a-130d may be operable to support low power idle (LPI) and/or sub-rating, also referred to as subset PHY, techniques. LPI may generally refer a family of techniques where, instead of transmitting conventional IDLE symbols during periods of inactivity, the networking subsystems 130a-130d may remain silent and/or communicate signals other than conventional IDLE symbols. Sub-rating, or sub-set PHY, may generally refer to a family of techniques where the PHYs are reconfigurable, in real-time or near real-time, to communicate at different data rates.

Furthermore, the network node 102, the network nodes 104a and 104b, and/or the network node 106 may be operable to implement other energy saving features that may not be associated with networking functions. In this regard, various aspects of the invention may be utilized in conjunction with other energy saving features. For example, monitors and/or hard drives may be powered down at various times in order to save energy and aspects of the invention may be utilized to communicate and/or manage such functions.

Algorithms, heuristics, or other factors that determine how the EEN techniques are utilized or implemented are referred to herein as the EEN control policy. In this regard, a network nodes' EEN control policy may, for example, control when the network node transitions into an energy saving state, when the device transitions out of an energy saving state, how much data the device may buffer while in an energy saving state, and control when one or more EEN techniques are enabled or disabled. Accordingly, each of the networking subsystems 130a-130d, or PHYs therein, may comprise a management information base (MIB) 120 and an EEN module 122 for implementing an EEN control policy. Each of the MIBs 120a-120d may comprise suitable logic, circuitry, interfaces, and/or code that may be operable to store and/or manage one or more networking parameters. The network parameters may be utilized to control communications of the corresponding one of the networking subsystems 130a-130d. Each of the EEN modules 122a-122d may comprise suitable logic, circuitry, interfaces, and/or code that may be operable to implement, utilizing one or more EEN parameters stored in a corresponding one of the MIBs 120a-120d, an EEN control policy.

Parameters that may be stored in one or more of the MIBs 120a-120d may comprise, for example, coefficients or other values for negotiating data rates of a network link and/or maintaining synchronization on the network link. Moreover, in various embodiments of the invention, various parameters associated with implementing EEN may be stored in the MIBs 120a-120d. For example, one or more of the parameters may determine and/or indicate whether EEN is enabled in a network node. Furthermore, each of a plurality of such parameters, or bits of such parameters, may correspond to a particular port, or other portion of a network node. In this manner, EEN may be enabled and disabled on, for example, a port-by-port basis.

Additional EEN parameters stored in or managed via the MIB 120a may comprise: a parameter that indicates EEN techniques (such as LPI and subset PHY) supported by the network node 102; a parameter that indicates subset PHY data rates supported by the network node 102; one or more networking parameters that indicate an amount of time required for the network node 102 to transition into one or more energy saving modes; one or more networking parameters that indicate an amount of time required for the network node 102 to transition out of one or more energy saving modes; a parameter that indicates whether the network node 102 is operating in an energy saving mode; a parameter that indicates whether an EEN transition or other event is scheduled to occur in the network node 102; an amount of time for which the network node 102 may operate in an energy-saving mode; one or more parameters that indicate latency that may be tolerated; one or more parameters that may be utilized to classify packets based on energy that may be utilized for routing and/or forwarding those packets; one or more parameters that may be utilized to classify packets based on QoS required for those packets; one or more parameters that indicate which packets and/or traffic may wake a device from an energy-saving mode; one or more parameters that indicate which packets and/or traffic may put a device into an energy-saving mode; and parameters that determine how much data may be buffered while operating in an energy saving mode.

In various embodiments of the invention, different parameters may be associated with different ports or connections of a network node. Similarly, multiple values of a parameter corresponding to multiple ports or connections may be stored in a network node. In this manner, EEN may be controlled asymmetrically such that EEN parameters associated with uplink traffic may be different than EEN parameters associated with a downlink traffic. For example, EEN may be disabled in one direction along a path and enabled in the other direction along the same path.

The DSPs 134a-134d may comprise suitable logic, circuitry, interfaces, and/or code that may be operable to process and/or handle digital bitstreams. The DSPs may be operable to perform complex computations and/or algorithms to, for example, encrypt, decrypt, encode, and decode digital signals. In this regard, the DSPs 134a-134d may each process or handle packets and/or signals received from a corresponding one of the networking subsystems 130a-130d. Similarly, the DSPs 134a-134d may each process or handle packets and/or signals to be provided to a corresponding one of the networking subsystems 130a-130d for transmission. The DSPs 134a-

134*d* may also provide control and/or feedback information to the networking subsystems 130*a*-130*d* based on received and/or to-be-transmitted packets or signals. The DSPs 134*a*-134*d* may each communicate information and/or data to a corresponding one of the processors 132*a*-132*d* and/or a corresponding one of the memories 136*a*-136*d*. Information communicated from one of the DSPs 134*a*-134*d* to a corresponding one of processors 132*a*-132*d* may be extracted from, or generated based on, packets or signals received via a corresponding one of networking subsystems 130*a*-130*d*. Moreover, each the DSPs 134*a*-134*d* may receive information from a corresponding one of the processors 132*a*-132*d* and/or from a corresponding one of the memories 136*a*-136*d*. Each of the DSPs 134*a*-134*d* may process the information and convey the processed information to a corresponding one of the network subsystems 130*a*-130*d* for transmission.

Each of the memories 136*a*-136*d* may comprise suitable logic, circuitry, interfaces, and/or code that may enable storage of data, code, and/or other information utilized by a corresponding one of the network nodes 102, the devices 104*a* and 104*b*, and the host 106. For example, each of the memories 136*a*-136*d* may be utilized for storing processed data generated by a corresponding one of the DSPs 134*a*-134*d* and/or by a corresponding one of the processors 132*a*-132*d*. The memories 136*a*-136*d* may also be utilized to store information such as executable code and/or configuration information that may be utilized to control the operation of the network node 102, network nodes 104*a* and 104*b*, and the host 106. Such configuration information may, for example, comprise EEN parameters that may control implementation of one or more EEN techniques and/or policies.

The processors 132*a*-132*d* may comprise suitable logic, circuitry, interfaces, and/or code that may be operable to perform control and/or data processing operations within the network node 102, the networking devices 104*a* and 104*b*, and the host 106. Each of the processors 132*a*-132*d* may be operable to control at least a portion of a corresponding one of the networking subsystems 130*a*-130*d*, the DSPs 134*a*-134*d*, and the memories 136*a*-136*d*. The processors 132*a*-132*d* may be operable to generate at least one signal for controlling operations within the network node 102, the networking devices 104*a* and 104*b*, and the host 106. The processors 132*a*-132*d* may also be operable to execute applications that may be utilized by the network node 102, the networking devices 104*a* and 104*b*, and the host 106. For example, the processors 132*a*-132*d* may be operable to execute applications that may enable displaying and/or interacting with content received via the networking subsystems 130*a*-130*d*.

In operation, an EEN control policy of the network 100 may be utilized to optimize energy efficient and performance across the network 100. Accordingly, various components of the network 100 may exchange information, and may be configured based on the exchanged information, such that energy efficiency and performance are optimized. In this regard, EEN parameters in the MIBs 120*a*-120*d* may be managed via an exchange of messages between two or more of the network node 102, the networking devices 104*a* and 104*b*, and the host 106. For example, EEN parameters values may be determined or configured based on applications running on the network node 102 and/or the host 106, and/or based on information to be exchanged between the network node 102 and the host 106. Similarly, the EEN modules 122*a* may be configured based on applications running on the network node 102 and/or the host 106, and/or based on information to be exchanged between the network node 102 and the host 106. Management of the EEN parameters along a network path via messages generated by a network node may, for example, be utilized to enable and disable EEN along the path.

Although, the configuration of the nodes is described with regard to configuring EEN parameters, the invention is not limited to configuration and/or management of the parameters. In this regard, aspects of the invention may enable configuring and/or exchanging the EEN control policies of the various nodes in the network 100. That is, aspects of the invention may also enable configuring and/or managing the EEN control policies that make use of the EEN parameters.

Figure 2A:
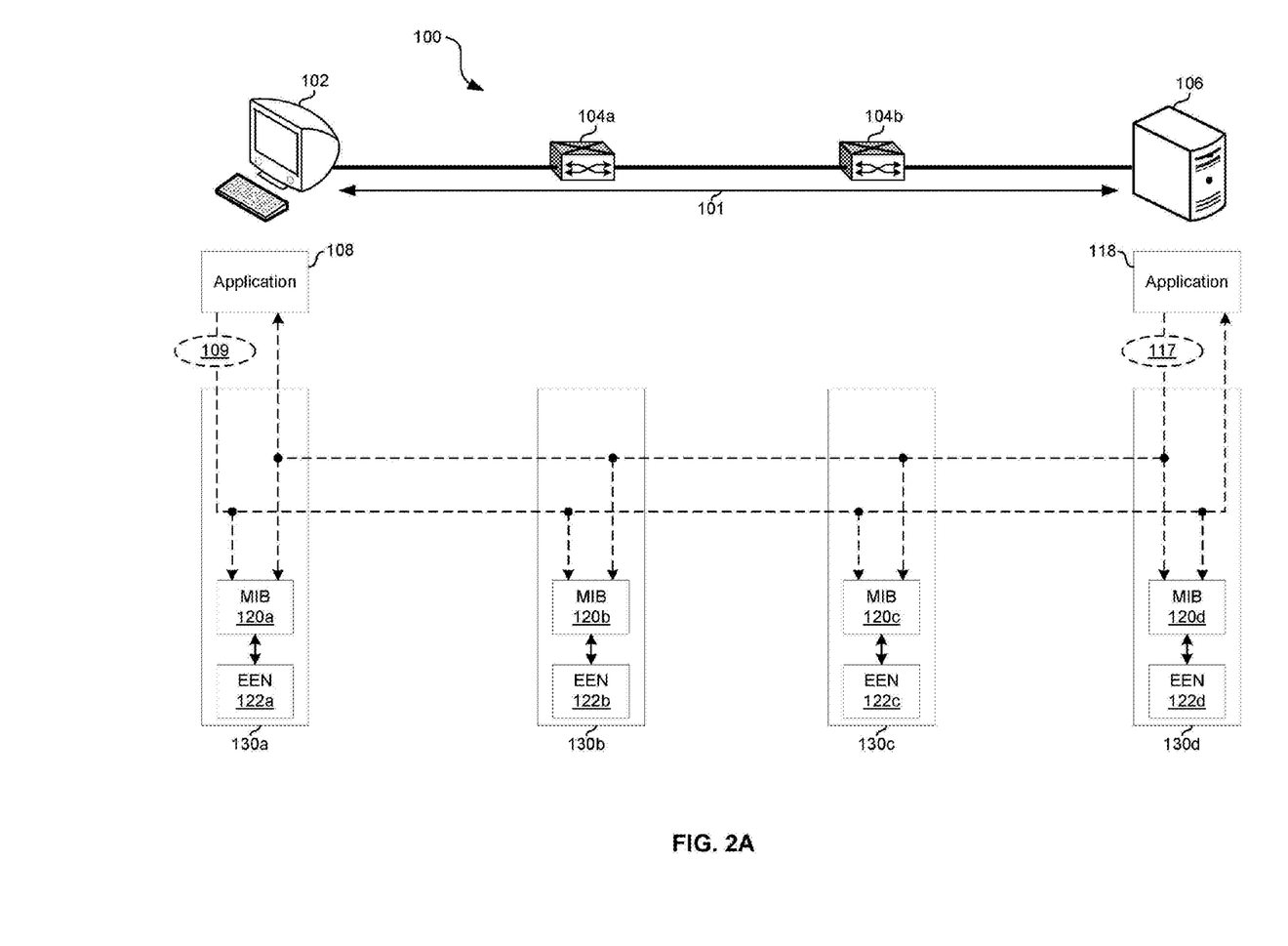
FIG. 2A is a diagram illustrating discovery and configuration of a network path utilizing end-to-end messages, in accordance with an embodiment of the invention.

FIG. 2A is a diagram illustrating discovery and configuration of a network path utilizing end-to-end messages, in accordance with an embodiment of the invention. Referring to FIG. 2A, there is shown the network 100 described with respect to FIG. 1. In FIG. 2A, there may be applications 108 and 118 running, respectively, on the network node 102 and the host 106.

In operation, the application 108 may generate messages 109 and send the messages 109 to the host 106. The messages 109 and 117 may enable determination of the path 101 traversed by the messages 109 and 117, determination of characteristics and/or capabilities of the path 101, and configuration of EEN parameters in the network node 102, the network nodes 104 and 104*b*, and the host 106.

In an exemplary embodiment of the invention, the network node 102 may generate a message 109 and send the message 109 to the host 106. As the message 109 traverses the path 101, the network node 102 and the networking devices 104*a* and 104*b* may insert or append information to the message 109. In this regard, information appended and/or inserted by a network node may indicate whether the node supports EEN, and if so, which EEN techniques or protocols the node supports. The host 106 may receive the message 109 and utilize the information appended to the message 109 to determine the path 101 and/or characteristics, including EEN characteristics, of the path 101. Similarly, the host 106 may generate a message 117 and send the message 117 to the network node 102. As the message 117 traverses the path 101, the host 106 and the networking devices 104*a* and 104*b* may insert or append information to the message 117. In this regard, information appended and/or inserted by a network node may indicate whether the node supports EEN, and if so, which EEN techniques or protocols the node supports. The network node 102 may receive the message 117 and utilize the information appended to the message 117 to determine the path 101 and/or characteristics, including EEN characteristics, of the path 101.

In another embodiment of the invention, the path 101 may be determined over time as packets are forwarded along the network. In another embodiment of the invention, the path 101 may be determined based on manual configuration by a network administrator. In this regard, a network administrator may program one or more tables or data structures into the nodes of the network 100. Accordingly, the applications 108 and 118 may reference such tables or data structures stored either locally in the network node 102 and/or in a remote network node when determining a path traversed by a datastream In another embodiment of the invention, the path 101 may be determined based on information obtained from a centralized management entity or server. In this regard, the network configuration or topology may be downloaded from such a management entity or server.

Although FIG. 1 is described with regard to the path 101 between two network nodes, aspects of the invention may be utilized for any network path between any two network nodes that operate at OSI layer 2 or higher OSI layers.

Subsequent to determining the nodes along the path 101, the application 108 may generate one or more messages 109 to configure one or more EEN parameters along the path 101. Similarly, the application 118 may generate one or more messages 117 to configure one or more EEN parameters along the path 101. Configuring the EEN parameters may comprise, for example, enabling and/or disabling EEN along the path 101. In various embodiments of the invention, the messages 109 and 117 may be distinctly marked. The marking may comprise, for example, a distinct Ethertype and/or frame format. In this regard, upon detecting such a marked message 109 or 117, a node along the path 101 may configure its EEN module 120 and/or its MIB 122 based on the information conveyed via the message 109 or 117.

In various embodiments of the invention, the messages 109 and 117 may comprise fields defined by IEEE 802.1Qat—IEEE Standard for Local and Metropolitan Area Networks: Virtual Bridged Local Area Networks—Amendment 9: Stream Reservation Protocol (SRP). Additionally, the messages 109 and 117 may comprise one or more EEN fields for conveying EEN parameter values and/or other information for configuring EEN parameters along the path 101. In an exemplary embodiment of the invention, the EEN fields may be modifiable and/or expandable. For example, each node along the path 101 may append its EEN capabilities and/or a configuration of its EEN parameters to the EEN field(s) of the messages 109 and/or 117 prior to forwarding the messages 109 and/or 117. In this manner, the messages 109 and/or 117 may accumulate path information as they propagate along the path 101 and, upon reaching an network node 102 or 108, such information may be extracted to determine the nodes of the path 101, the configuration of nodes along the path 101, and/or the capabilities of the nodes along the path 101.

Additionally, after the path 101, its configuration, and/or its capabilities are known, one or more messages 109 and/or 117 comprising IEEE 802.1Qat defined fields and EEN fields may be communicated to configure EEN parameters along the path 101. In this regard, the messages 109 and 117 may configure EEN parameters along the path 101 in much the same manner as conventional SRP packets would reserve resources along the path 101. Details of a similar use of stream reservation protocol packets can be found in the above referenced U.S. patent application Ser. No. 12/015,671 filed on Jan. 17, 2008.

In some embodiments of the invention, EEN parameters along the path 101 may be configured based on available resources along the path 101 and reservations desired to be made along the path 101. In this regard, when a request to reserve resources along the path 101 is received, each node along the path 101 may determine if and/or how EEN may be implemented while honoring the reservation. For example, because various EEN techniques may increase latency along the path 101, EEN may be disabled along the path 101 in instances that resources along the path 101 are being reserved for traffic that requires low latency. In this regard, EEN parameters may be configured based on quality of service parameters associated with data streams communicated along the path 101. Exemplary quality of service parameter comprise maximum tolerable latency, maximum tolerable packet jitter, minimum instantaneous data rate, minimum average data rate, maximum packet drop rate, and maximum bit-error rate.

In some embodiments of the invention, EEN parameters along the path 101 may be configured periodically or cyclically. For example, EEN may be periodically or cyclically enabled and disabled in one or more nodes of the network path 101. That is, during a time interval, the one or more nodes may cycle in and out of an energy efficient state one or more times.

Although FIG. 2A depicts a simplified network path, aspects of the invention may be utilized with networks of any topology and/or with paths that traverse multiple networks. In this regard, in instances that the 109 and 117 cross one or more network boundaries, the messages 109 and 117 may be encapsulated in one or more protocol data units associated with one or more higher OSI layer protocols.

Figure 2B:
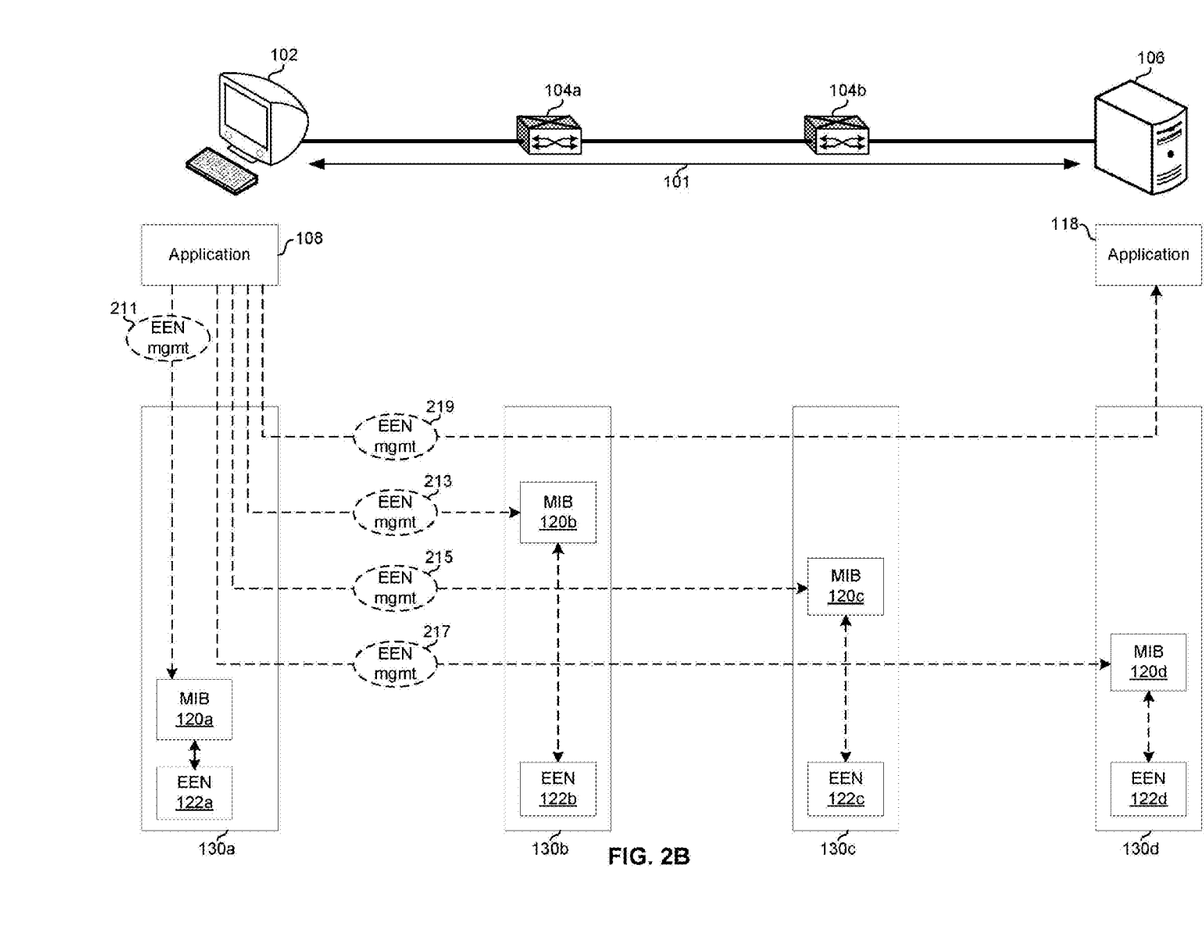
FIG. 2B illustrates configuration and/or management of energy efficient parameters along a network path utilizing a plurality of point-to-point messages, in accordance with an embodiment of the invention.

FIG. 2B illustrates configuration and/or management of energy efficient parameters along a network path utilizing a plurality of point-to-point messages, in accordance with an embodiment of the invention. Referring to FIG. 2B, there is shown the network 100 described with respect to FIGS. 1 and 2A.

In operation, subsequent to determination of the network path 101 between the application 108 and 118, the network node 102 may generate a plurality of EEN control messages 211-217 to configure EEN parameters in the devices along the network path 101. In this regard, the network node 102 may generate a EEN control message for each node along the path 101. In an exemplary embodiment of the invention, the messages 211-217 may be generated and/or communicated in adherence to a management protocol such as SNMP. Although FIG. 2B is described with regard to messages 211-217 being generated and communicated by the network node 102, the invention is not so limited. In this regard, messages such as the messages 211-217 may be generated and communicated by the host 106. Similarly, the network nodes 104a and 104b may, in various embodiments of the invention, be operable to generate and communicate messages for configuring EEN parameters along the path 101. In this regard, the network nodes 104a and 104b may desire or need to configure EEN parameters along the path 101 based on characteristics and/or conditions of other network paths (not shown) which the network nodes 104a and 104b are a part of. For example, the network node 104a may be heavily loaded by a high priority data stream being communicated along a network path 250 (not shown) and thus EEN protocols and/or techniques that may be implemented by the network node 104a may be limited based on the traffic on path 250.

Although FIG. 2B depicts a simplified network path, aspects of the invention may be utilized with networks of any topology and/or with paths that traverse multiple networks. In this regard, in instances that one or more of the messages 211, 216, 215, 217, 219 cross one or more network boundaries, the one or more of the messages 211, 216, 215, 217, 219 may be encapsulated in one orm ore protocol data units associated with one or more high OSI layers.

Figure 2C:
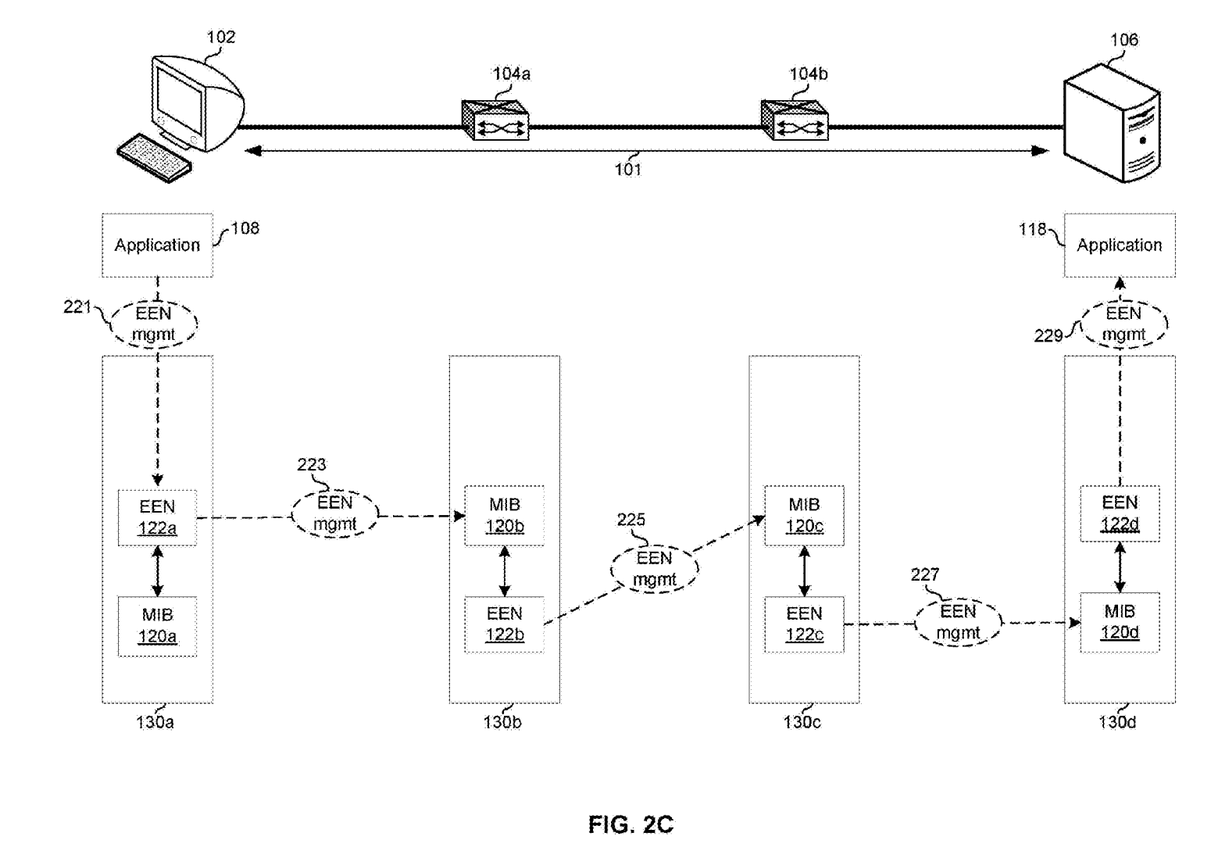
FIG. 2C illustrates configuration and/or management of energy efficient parameters along a network path utilizing cascaded messages, in accordance with an embodiment of the invention.

FIG. 2C illustrates configuration and/or management of energy efficient parameters along a network path utilizing cascaded messages, in accordance with an embodiment of the invention. Referring to FIG. 2C, there is shown the network 100 described with respect to FIGS. 1, 2A, and 2B.

In operation, the application 108 may generate a message 221 to configure EEN parameters in the MIB 120a of the network node 102. In response to the configuration of the MIB 120a, the EEN module 122a may generate a corresponding message 223 for configuring the next node in the path 101, which is network node 104a. The message 221 may be received in the network node 104a and parameters in the MIB 120b may be configured based on the message 223. In response to the configuration of the MIB 120b, the EEN module 122b may generate a corresponding message 225 for configuring the next node in the path 101, which is network node 104b. The message 225 may be received in the network node 104b and parameters in the MIB 120c may be configured based on the message 225. In response to the configuration of the MIB 120c, the EEN module 122c may generate a corresponding message 227 for configuring the next node in the path 101, which is host 106. In response to the configuration of MICB 120d, the EEN module 122d may notify the application 118 of the new configuration.

In this manner, the application 108 may trigger cascaded messages for configuring EEN along the network path 101. In various embodiments of the invention, the messages 221-229 may be, for example, physical layer signals and/or packetized data. In some embodiments of the invention the messages 221-229 may be communicated in accordance with LLDP or similar protocols. In this regard, one or more type length value (TLV) fields for communicating EEN parameters may be defined and may be utilized for managing the EEN parameters and/or EEN control policies of the network nodes 102, 104a, 104b, and 106.

Although FIG. 2C is described with reference to a configuration initiated by the network node 102, the invention is not so limited. In this regard, the host 106 and/or the network nodes 104a and 104b may be operable to trigger a configuration of EEN parameters along the path 101.

Although FIG. 2C depicts a simplified network connection, aspects of the invention may be utilized with networks of any topology and/or with paths that traverse multiple networks. In this regard, in instances that one or more of the messages 211, 216, 215, 217, 219 cross one or more network boundaries, the one or more of the messages 211, 216, 215, 217, 219 may be encapsulated in one or more protocol data units associated with one or more high OSI layers.

Figure 3:
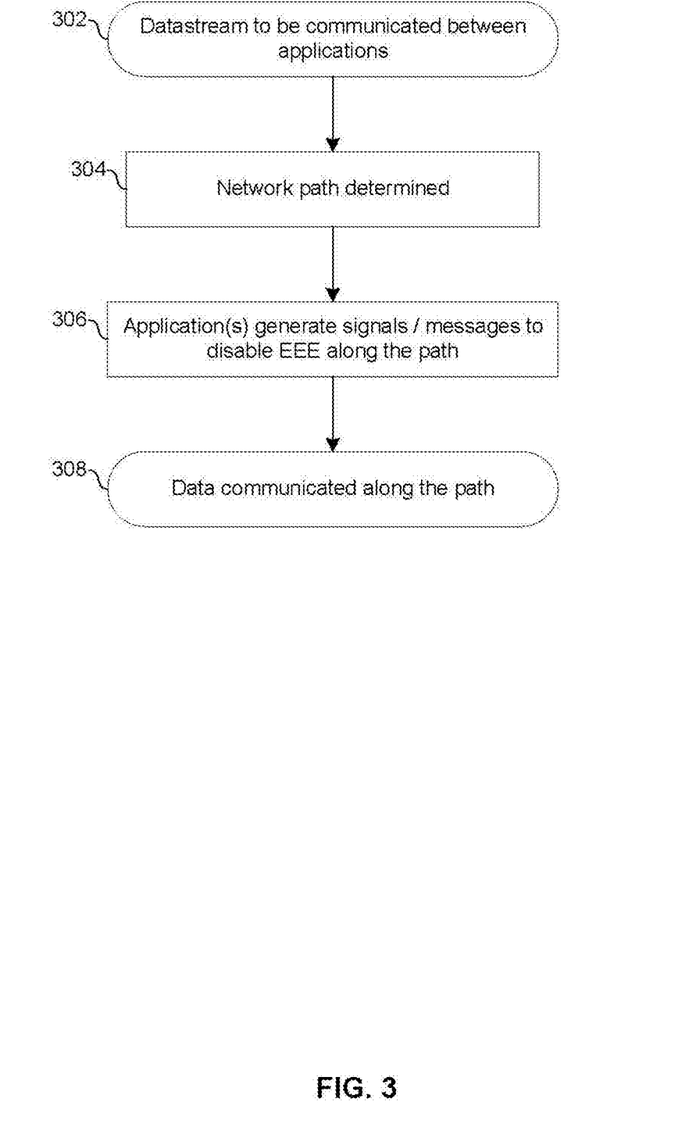
FIG. 3 is a flowchart illustrating end-to-end configuration and/or management of energy efficient networking (EEN) parameters, in accordance with an embodiment of the invention.

FIG. 3 is a flowchart illustrating end-to-end configuration and/or management of EEN parameters, in accordance with an embodiment of the invention. Referring to FIG. 3, the exemplary steps may begin with step 302 when there is a datastream to be communicated between the application 108 and the application 118. For example, the application 108 may request data from the application 118 and it may be desired to deliver the data in an energy efficient manner. Subsequent to step 302, the exemplary steps may advance to step 304.

In step 304, the network path 101, or a portion thereof, over which the data is to be communicated, from the application 118 to the application 108, may be determined. In an exemplary embodiment of the invention, AVB protocols and/or modified AVB protocols may be utilized to determine the network path. In another exemplary embodiment of the invention, the network path 101 may be determined based on tables generated over time as packets are communicated in the network 100 and/or tables set up by a network administrator. In addition to determining the path, the EEN capabilities and/or configuration of the nodes along the path may also be determined. Subsequent to step 304, the exemplary steps may advance to step 306.

In step 306, the application 108 and/or the application 118 may generate one or more message to configure, or trigger configuration, of EEN parameters along the path 101. For example, the data requested from the application 118 by the application 108 may require low-latency, and thus may want to ensure that one or more EEN protocols do not delay transmission of the data along the path 101. Accordingly, the application 118 and/or the application 108 may generate one or more messages to disable EEN along the path 101. The generated messages may be similar to the messages 109 and 117 described with respect to FIG. 2A, the messages 211-217 described with respect to FIG. 2B, and/or the message 221 described with respect to FIG. 2C. In this manner, configuration of the path 101 may occur as described with respect to one or more of FIGS. 2A-2C. Subsequent to step 306, the exemplary steps may advance to step 308.

In step 308, the data may be communicated along the configured path 101. In this regard, the communication of the data may be optimized with regard to performance and energy efficiency.

Aspects of a method and system for end-to-end management of energy efficient networking protocols are provided. In an exemplary embodiment of the invention, a path 101 between two network nodes 102 and 106 may be determined and one or more messages 109 (FIG. 2A), 117 (FIG. 2A), 211-217 (FIG. 2B), and/or 221-229 (FIG. 2C) for configuring one or more (EEN) parameters along the determined network path 101 may be generated. The one or more messages 109, 117, 211-217, and/or 221-229 may be communicated to one or more of the nodes 102, 104a, 104b, and/or 106 along the determined path 101. The one or more generated messages 109, 117, 211-217, and/or 221-229 may comprise a distinct marking that may, upon detection by the network nodes 102, 104a, 104b, and/or 106, trigger configuration of the one or more EEN parameters within the one or more network nodes 102, 104a, 104b, and/or 106. The one or more messages 109, 117, 211-217, and/or 221-229 may comprise one or more fields defined by the IEEE 802.1Qat standard, and one or more fields that convey information for configuring EEN parameters along the determined path 101. The one or more messages may be communicated in accordance with a network management protocol, for example, the simple network management protocol (SNMP). The one or more messages may be communicated in accordance with logical link discovery protocol (LLDP) and may comprise one or more EEN TLVs.

The path 101 may be determined via communication of one or more packets along the path, wherein information identifying EEN capabilities of the nodes 102, 104a, 104b, and/or 106 along the determined path 101 may be inserted by the network nodes 102, 104a, 104b, and/or 106 along the determined path 101 as the one or more packets traverse the determined path 101. The EEN parameters may be stored in a PHY of each of the network nodes 102, 104a, 104b, and/or 106 along the determined path 101. The one or more EEN parameters may be configured based on the application 108 running on the first network node 102 and/or the application 118 running on the second network node 106. The one or more EEN parameters may be configured based on quality of service required for data to be communicated over the determined path 101. The one or more EEN parameters may be configured based on resource reservation packets communicated along the determined path 101. The one or more parameters may comprise a parameter that controls whether EEN is enabled or disabled in one or more of the nodes 102, 104a, 104b, and/or 106.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for end-to-end management of energy efficient networking protocols.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
   generating, by a first network node, a message having a second network node as a destination, the generated message including one or more energy efficient networking parameters for use by an intermediate network node along a path between the first network node and the second network node; and
   transmitting, by the first network node, the generated message to an intermediate network node on the path between the first network node and the second network node for configuration of an energy saving operation of the intermediate network node to accommodate application communication between the first network node and the second network node.

2. The method of claim 1, wherein the generated message includes information that enables the intermediate network node to enable or disable an energy efficiency feature of the intermediate network node.

3. The method of claim 1, wherein the generated message includes information that enables the intermediate network node to adjust an energy efficiency feature of the intermediate network node that impacts latency of application data communicated between the first network node and the second network node.

4. The method of claim 1, wherein the generated message includes information that enables the intermediate network node to adjust an amount of time for the intermediate network node to transition into or out of an energy saving mode.

5. The method of claim 1, wherein the generated message includes information that enables the intermediate network node to adjust when the intermediate network node can enter into or out of an energy saving mode.

6. The method of claim 1, wherein the generated message includes information that enables the intermediate network node to adjust an amount of time that the intermediate network node can remain in an energy saving mode.

7. The method of claim 1, wherein the generated message includes information that enables the intermediate network node to adjust an energy efficiency feature of the intermediate network node that impacts a quality of service of application data communicated between the first network node and the second network node.

8. A first network node, comprising:
   a controller configured to generate a message having a second network node as a destination, the generated message including one or more energy efficient networking parameters for use by an intermediate network node along a path between the first network node and the second network node; and
   a transmitter configured to transmit the generated message to the intermediate network node on the path between the first network node and the second network node for configuration of an energy saving operation of the intermediate network node to accommodate application communication between the first network node and the second network node.

9. The first network node of claim 8, wherein the generated message includes information that enables the intermediate network node to enable or disable an energy efficiency feature of the intermediate network node.

10. The first network node of claim 8, wherein the generated message includes information that enables the intermediate network node to adjust an energy efficiency feature of the intermediate network node that impacts latency of application data communicated between the first network node and the second network node.

11. The first network node of claim 8, wherein the generated message includes information that enables the intermediate network node to adjust an amount of time for the intermediate network node to transition into or out of an energy saving mode.

12. The first network node of claim 8, wherein the generated message includes information that enables the intermediate network node to adjust when the intermediate network node can enter into or out of an energy saving mode.

13. The first network node of claim 8, wherein the generated message includes information that enables the intermediate network node to adjust an amount of time that the intermediate network node can remain in an energy saving mode.

14. The first network node of claim 8, wherein the generated message includes information that enables the intermediate network node to adjust an energy efficiency feature of the intermediate network node that impacts a quality of service of application data communicated between the first network node and the second network node.

15. A method, comprising:
    receiving, by an intermediate network node, a message generated by a first network node and having a second network node as a destination, the generated message including one or more energy efficient networking parameters for use by an intermediate network node along a path between the first network node and the second network node; and
    configuring, by the intermediate network node using the generated message, an energy saving operation of the intermediate network node to accommodate application communication between the first network node and the second network node.

16. The method of claim 15, wherein the configuring comprises enabling or disabling an energy efficiency feature of the intermediate network node.

17. The method of claim 15, wherein the configuring comprises adjusting an energy efficiency feature of the intermediate network node that impacts latency of application data communicated between the first network node and the second network node.

18. The method of claim 15, wherein the configuring comprises adjusting an amount of time for the intermediate network node to transition into or out of an energy saving mode.

19. The method of claim 15, wherein the configuring comprises adjusting when the intermediate network node can enter into or exit from an energy saving mode.

20. The method of claim 15, wherein the configuring comprises adjusting an amount of time that the intermediate network node can remain in an energy saving mode.

* * * * *